United States Patent
Gidvani et al.

(10) Patent No.: US 12,284,596 B2
(45) Date of Patent: Apr. 22, 2025

(54) SYSTEM AND METHOD FOR MANAGING GROWING BEACON SIZE IN A WIRELESS NETWORK

(71) Applicant: Samsung Electronics Co., Ltd., Suwon-si (KR)

(72) Inventors: Ravi Gidvani, Fremont, CA (US); Shailender Karmuchi, Fremont, CA (US); Ashok Ranganath, Los Gatos, CA (US); Srinivas Kandala, Morgan Hill, CA (US); Wookbong Lee, San Jose, CA (US); Michail Koundourakis, Hamburg (DE)

(73) Assignee: Samsung Electronics Co., Ltd., Yongin-si (KR)

( * ) Notice: Subject to any disclaimer, the term of this patent is extended or adjusted under 35 U.S.C. 154(b) by 532 days.

(21) Appl. No.: 17/675,820

(22) Filed: Feb. 18, 2022

(65) Prior Publication Data

US 2023/0044914 A1     Feb. 9, 2023

Related U.S. Application Data

(60) Provisional application No. 63/241,191, filed on Sep. 7, 2021, provisional application No. 63/229,362, filed on Aug. 4, 2021.

(51) Int. Cl.
*H04W 48/10* (2009.01)
*H04W 48/16* (2009.01)

(52) U.S. Cl.
CPC ........... *H04W 48/10* (2013.01); *H04W 48/16* (2013.01)

(58) Field of Classification Search
CPC ............................. H04W 48/10; H04W 48/16
See application file for complete search history.

(56) References Cited

U.S. PATENT DOCUMENTS

| 7,535,884 | B2 | 5/2009 | Stephenson et al. |
| 9,497,598 | B2 | 11/2016 | Liu |
| 9,626,698 | B2 | 4/2017 | Abraham et al. |
| 10,187,854 | B2 | 1/2019 | Trainin et al. |
| 10,952,139 | B2 | 3/2021 | Asterjadhi et al. |
| 2013/0287043 | A1 | 10/2013 | Nanda et al. |
| 2013/0301569 | A1* | 11/2013 | Wang ............ H04L 1/1607 370/329 |
| 2018/0192369 | A1 | 7/2018 | Cohn et al. |
| 2018/0279209 | A1* | 9/2018 | Fang ............ H04L 27/261 |
| 2019/0297632 | A1* | 9/2019 | Huang ............ H04W 84/12 |
| 2024/0114455 | A1* | 4/2024 | Baek ............ H04W 56/0015 |

OTHER PUBLICATIONS

European Search Report for EP Application No. 22188095.8 dated Dec. 21, 2022, 10 pages.
Fischer, M. "A Possible Solution to the Beacon Length Problem", IEEE Draft; IEEE-SA Mentor, Piscataway, NJ USA, vol. 802. 11m, No. 1, May 14, 2015, pp. 1-10.

* cited by examiner

*Primary Examiner* — Benjamin H Elliott, IV
*Assistant Examiner* — Tracy Lauren Colbert
(74) *Attorney, Agent, or Firm* — Lewis Roca Rothgerber Christie LLP

(57) ABSTRACT

A system and method for managing beacon size. In some embodiments, the method includes: transmitting, by an Access Point Station (AP STA) a first beacon; transmitting, by the AP STA, a second beacon indicating feature information; and transmitting, by the AP STA, a first follow-on beacon, the first follow-on beacon supplementing the feature information indicated in the second beacon.

19 Claims, 5 Drawing Sheets

SYSTEM AND METHOD FOR MANAGING GROWING BEACON SIZE IN A WIRELESS NETWORK

CROSS-REFERENCE TO RELATED APPLICATION(S)

The present application claims priority to and the benefit of U.S. Provisional Application No. 63/229,362, filed Aug. 4, 2021, entitled " BEACON/PROBE RESPONSE SIZE ISSUE", the present application claims priority to and the benefit of U.S. Provisional Application No. 63/241,191, filed Sep. 7, 2021, entitled "SOLUTION FOR ACCOMMODATING EXPANDING SIZE OF BEACON IN 802.11 WIRELESS BSS"; the entire contents of both of the provisional patent applications identified in this paragraph are incorporated herein by reference.

FIELD

One or more aspects of embodiments according to the present disclosure relate to wireless networking, and more particularly to a system and method for managing beacon size in a wireless network.

BACKGROUND

The size of the beacon used by WiFi systems has increased significantly and it may continue to increase. In most circumstances, an Access Point Station is expected to broadcast all of the Information Elements to maintain backward compatibility with existing non-Access Point Stations. The beacon may be sent at the lowest data rate and may therefore occupy significant air time. As a result, a considerable amount of power may be consumed by non-Access Point Stations which may be required to stay awake to receive the entire beacon.

It is with respect to this general technical environment that aspects of the present disclosure are related.

SUMMARY

According to an embodiment of the present disclosure, there is provided a method, including: transmitting, by an Access Point Station (AP STA) a first beacon; transmitting, by the AP STA, a second beacon indicating feature information; and transmitting, by the AP STA, a first follow-on beacon, the first follow-on beacon supplementing the feature information indicated in the second beacon.

In some embodiments, the first beacon includes information specifying a time of transmission of the first follow-on beacon, and the transmitting of the first follow-on beacon includes transmitting the first follow-on beacon at the time specified by the first beacon.

In some embodiments, a gap between an end of the first follow-on beacon and a beginning of the second beacon has a length of one Short Interframe Space.

In some embodiments, the method further includes transmitting, by the AP STA, a third beacon indicating feature information, there not being a follow-on beacon including feature information supplementing the feature information indicated in the third beacon.

In some embodiments, the method further includes: receiving, by the AP STA, an action frame requesting a follow-on beacon; and sending, by the AP STA, in response to the receiving of the action frame, a follow-on beacon.

In some embodiments, the method further includes: transmitting, by the AP STA, a third beacon; transmitting, by the AP STA, a second follow-on beacon; and transmitting, by the AP STA, a fourth beacon, wherein: the second follow-on beacon includes feature information supplementing feature information indicated in the fourth beacon; and the transmitting of the second follow-on beacon includes transmitting the second follow-on beacon at a time specified by: the second beacon, and the third beacon.

In some embodiments, the second beacon is the same beacon as the first beacon.

In some embodiments, the transmitting, by the AP STA, of the first follow-on beacon includes transmitting the first follow-on beacon during a Broadcast Transmit Wait Time Service Period.

According to an embodiment of the present disclosure, there is provided an Access Point Station (AP STA) including: a radio; and a processing circuit, the processing circuit being configured to: transmit a first beacon; transmit a second beacon indicating feature information; and transmit a first follow-on beacon, the first follow-on beacon including feature information supplementing the feature information indicated in the second beacon.

In some embodiments, the processing circuit is further configured to transmit the first follow-on beacon at a time specified by the first beacon.

In some embodiments, a gap between an end of the first follow-on beacon and a beginning of the second beacon has a length of one Short Interframe Space.

In some embodiments: the processing circuit is further configured to transmit a third beacon indicating feature information, there not being a follow-on beacon including feature information supplementing the feature information indicated in the third beacon.

In some embodiments, the processing circuit is further configured to: transmit a third beacon; transmit a second follow-on beacon; and transmit a fourth beacon, wherein: the second follow-on beacon includes feature information supplementing feature information indicated in the fourth beacon; and the transmitting of the second follow-on beacon includes transmitting the second follow-on beacon at a time specified by: the second beacon, and the third beacon.

In some embodiments, a gap between an end of the first beacon and a beginning of the first follow-on beacon has a length of one Short Interframe Space.

In some embodiments, the transmitting, by the AP STA, of the first follow-on beacon, includes transmitting the first follow-on beacon during a Broadcast Transmit Wait Time Service Period.

According to an embodiment of the present disclosure, there is provided a method, including: receiving, by a non-Access Point Station (non-AP STA), a first beacon; receiving, by the non-AP STA, a second beacon indicating feature information; listening, by the non-AP STA, for a first follow-on beacon; and receiving, by the non-AP STA, the first follow-on beacon, the first follow-on beacon including feature information supplementing the feature information indicated in the second beacon.

In some embodiments: the first beacon includes information specifying a time of transmission of the first follow-on beacon; the listening for the first follow-on beacon includes listening for the first follow-on beacon at the time specified by the first beacon; and the receiving of the first follow-on beacon includes receiving the first follow-on beacon at the time specified by the first beacon.

In some embodiments, a gap between an end of the first follow-on beacon and a beginning of the second beacon has a length of one Short Interframe Space.

In some embodiments, the method further includes: receiving, by the non-AP STA, a third beacon receiving, by the non-AP STA, a second follow-on beacon; and receiving, by the non-AP STA, a fourth beacon, wherein: the second follow-on beacon includes feature information supplementing feature information indicated in the fourth beacon; and the receiving of the second follow-on beacon includes receiving second first follow-on beacon at a time specified by: the second beacon, and the third beacon.

In some embodiments, a gap between an end of the first beacon and a beginning of the first follow-on beacon has a length of one Short Interframe Space.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for managing beacon size in a wireless network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

As mentioned above, the size of the beacon used by WiFi systems has increased significantly since the first versions of WiFi, and it may continue to increase. In most circumstances, an Access Point Station (AP STA) is expected to broadcast all of the Information Elements to maintain backward compatibility with existing non-Access Point Stations (non-AP STAs), and the beacon may be sent at the lowest data rate and may therefore occupy significant air time. As a result, a considerable amount of power may be consumed by non-Access Point Stations which may be required to stay awake to receive the entire beacon. Associated non-AP STAs may be required to wake up frequently (e.g., as often as every Target Beacon Transmission Time (TBTT)) to listen to the beacon. Further, the implementation of some non-AP STAs may have limits on the size of the beacon; this may be an obstacle to future updates of the WiFi standard, or such nodes may become obsolete with some AP STAs. With Information Elements (IEs) like Multiple Basic Service Set Identifier (MBSSID), the beacon size may exceed 1500 bytes with a higher number of Basic Service Sets (BSSs).

Figure 1:
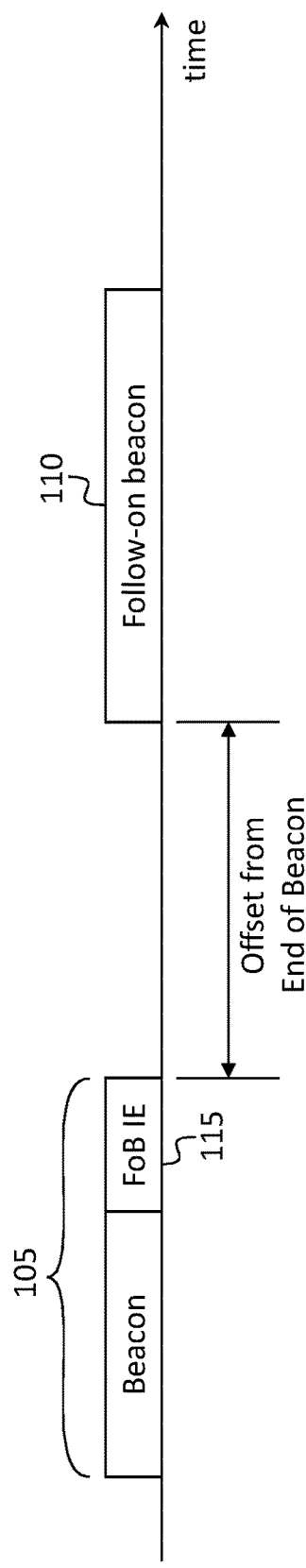
FIG. 1 is a signaling diagram, according to an embodiment of the present disclosure.

Referring to FIG. 1, in some embodiments the need to increase the size of the beacon 105 is reduced using a follow-on beacon ("FoB") 110 to carry feature information to supplement the feature information of the beacon. For example, an Information Element (IE) 115 may be defined in the beacon (e.g., an IE referred to as a follow-on beacon IE ("FoB IE" 115)) which indicates the presence of a follow-on beacon. The follow-on beacon IE 115 may also indicate the time interval (or "offset"), between the beacon that contains it, and the subsequently transmitted follow-on beacon 110. The follow-on beacon IE 115 may also include indications of which features (or groups of features) the feature information in the follow-on beacon 110 are relevant to. As such, a non-AP STA may listen for, and receive the follow-on beacon 110, if it supports a feature for which feature information is (according to, e.g., a flag or bit(s) in the follow-on beacon IE 115) in the follow-on beacon 110, and it may disregard (e.g., not listen for, and not receive) the follow-on beacon 110 if it does not support any feature for which feature information is (according to, e.g., the flag or bit in the follow-on beacon IE 115) in the follow-on beacon. Listening for, and receiving, a frame may entail turning on, or leaving turned on, the radio of the non-AP STA (the radio may be turned off (and, in some circumstances, the non-AP STA may be asleep) to save power when the non-AP STA is neither transmitting or receiving). For ease of illustration the drawings include illustrations showing a block labeled "beacon" and a separate block labeled "FoB IE"; as used herein, however, the follow-on beacon IE 115 is considered part of the beacon 105, and not a separate element from the beacon 105. As used herein, a "follow-on beacon" is a frame transmitted by an AP STA containing feature information that supplements feature information in a (previously or subsequently transmitted) beacon. As used herein, "feature information" is information transmitted by an AP STA for discovery and synchronization of features. For example, "feature information" may include a notification that the AP STA is turning on or off an antenna, or that the AP STA is supporting a feature such as multiple BSSID).

The beacon 105 (e.g., the follow-on beacon IE 115 that the beacon 105 contains) may specify the time at which the follow-on beacon 110 is transmitted. For example, the follow-on beacon IE 115 may include the offset of the follow-on beacon 110 from the start of the current TBTT (e.g., from the end of the beacon containing the follow-on beacon IE 115). This offset may be the time interval between (i) the end of the beacon containing the follow-on beacon IE 115 and (ii) the beginning of the follow-on beacon 110.

The follow-on beacon IE 115 may further specify the periodicity of the follow-on beacon 110, as a multiple of the TBTT (e.g., a value of 1 may indicate that the periodicity of the follow-on beacon 110 is equal to the TBTT). The follow-on beacon IE 115 may further specify the features advertised in the follow-on beacon 110, e.g., the features for which the follow-on beacon 110 contains feature information. This may be specified with a set of bits, each of which indicates the presence in the follow-on beacon 110 (or absence from the follow-on beacon 110) of feature information for a respective feature.

The follow-on beacon 110 may be a Management Media Access Control (MAC) Protocol Data Unit (Management MPDU) of a new subtype (e.g., using a currently reserved subtype) or it may be a category of the Management Action subtype (frame type 00, subtype 1101). To maintain backward compatibility, AP STAs may continue to broadcast the feature information for currently existing features in the beacon 105, and AP STAs may transmit feature information for new features in the follow-on beacon 110.

Non-AP STAs that support new features (features incorporated into the standard at the same time or after the incorporation of the follow-on beacon) may parse the follow-on beacon IE 115 and wait for the follow-on beacon 110 to parse IEs related to new features. The follow-on beacon 110 may also contain Timing Synchronization Function (TSF) to maintain synchronization; this may be advantageous when the follow-on beacon 110 does not follow closely after the beacon 105 with respect to which the offset is defined. The TSF may also be used by non-AP STAs to synchronize only to the follow-on beacon 110.

Figure 2:
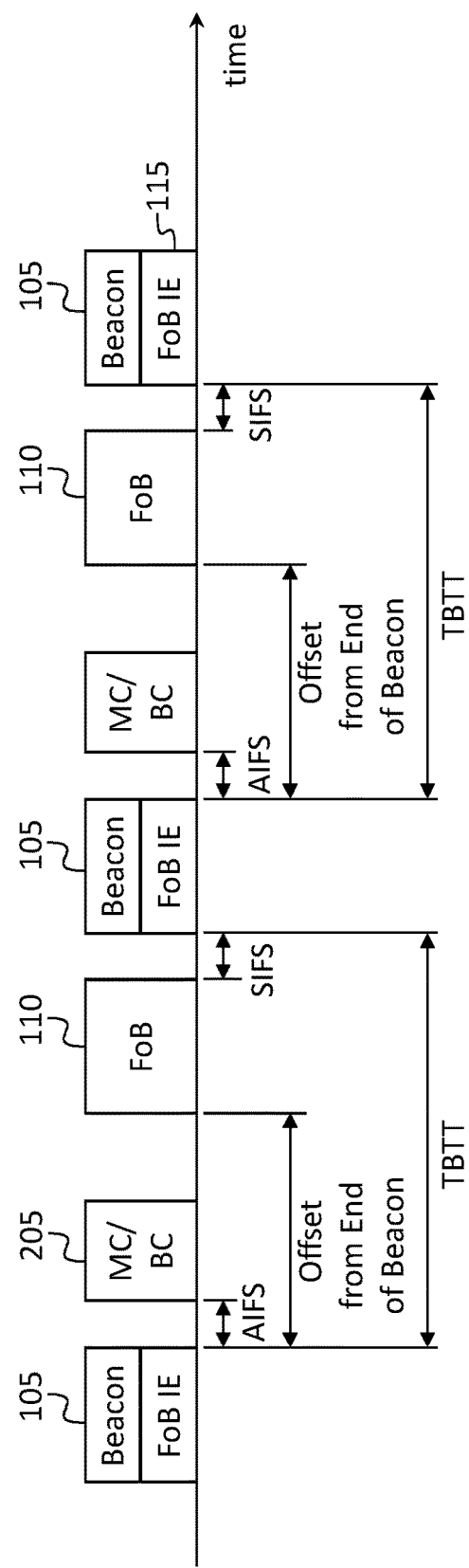
FIG. 2 is a signaling diagram, according to an embodiment of the present disclosure.

The follow-on beacon 110 may be implemented in various ways. For example, referring to FIG. 2, in some embodiments, each beacon 105 includes a follow-on beacon IE 115 that specifies the time of transmission of a follow-on beacon 110. The feature information of each follow-on beacon 110 supplements the feature information of the beacon 105 that follows the follow-on beacon 110; as such, each follow-on beacon 110 is associated with (and, in the embodiment of FIG. 2, between) (i) a first beacon 105 (preceding the follow-on beacon 110) which specifies when the follow-on beacon 110 will be transmitted and (ii) a second beacon 105 (following the follow-on beacon 110), the feature information of which is supplemented by the feature information contained in the follow-on beacon 110. In some embodiments, multicast (MC) or broadcast (BC) MPDUs 205 may be transmitted after (e.g., following by an Arbitration Interframe Spacing (AIFS)) one or more of the beacons 105. In some embodiments, each follow-on beacon 110 may precede by a relatively short gap, e.g., one SIFS, the beacon 105 that follows it; this may make it possible for a non-AP STA to receive both the follow-on beacon 110 and the beacon 105 that follows it, while remaining awake only slightly longer than their combined durations.

Figure 3:
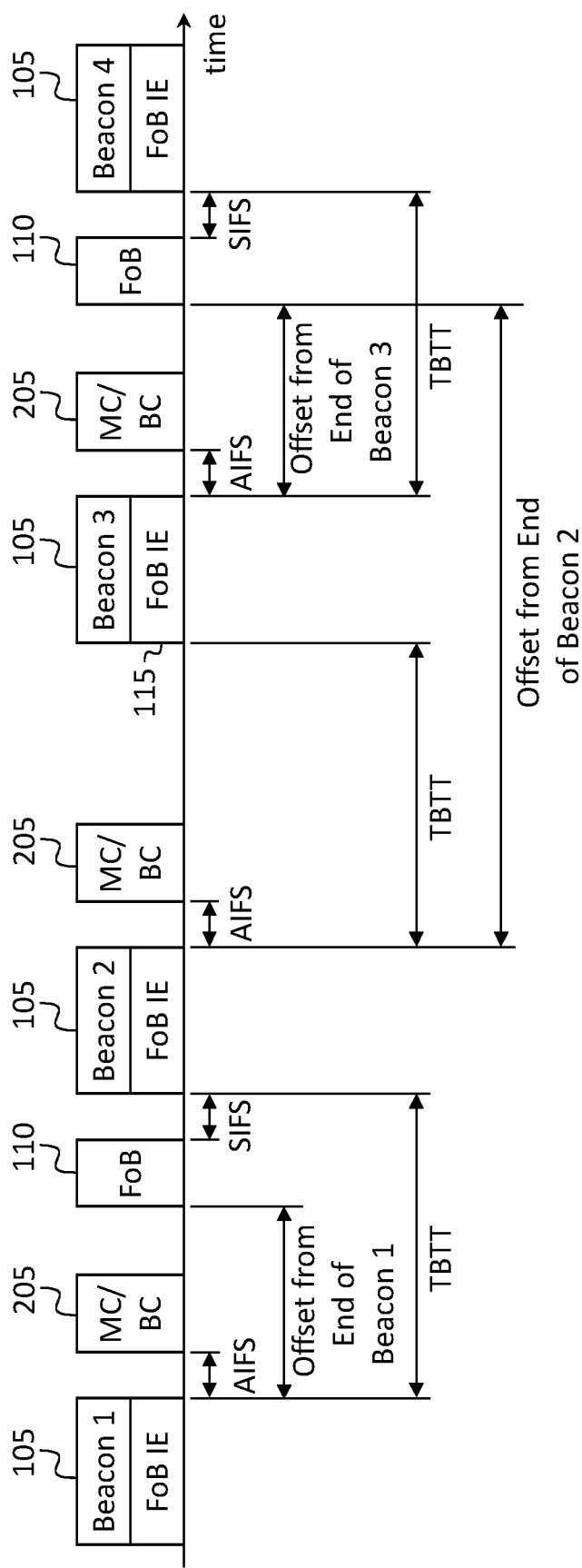
FIG. 3 is a signaling diagram, according to an embodiment of the present disclosure.

In some embodiments, the periodicity of the follow-on beacons 110 is greater than the TBTT; FIG. 3 shows an example of such a situation, with the periodicity of the follow-on beacons 110 being twice the TBTT. For example, a first beacon 105 ("Beacon 1") is followed by a follow-on beacon 110, and a third beacon ("Beacon 3") is followed by a follow-on beacon 110, but no follow-on beacon 110 is transmitted between a second beacon 105 ("Beacon 2", between the first beacon and the third beacon) and the third beacon, and no follow-on beacon 110 supplements the feature information contained in the third beacon. In the embodiment of FIG. 3, the time of transmission of the follow-on beacon 110 that precedes, and supplements the feature information of, a fourth beacon ("Beacon 4") is specified twice, once by, and with respect to, the second beacon, and once by, and with respect to, the third beacon (the same may be true for the follow-on beacon 110 that precedes the second beacon, although one of the beacons by which, and with respect to which, the time of transmission of this follow-on beacon 110 is specified is not illustrated in FIG. 3, because it precedes the first beacon). In an embodiment in which the periodicity of the follow-on beacons 110 is greater than the TBTT, a non-AP STA may send, to the AP STA, an action frame requesting a follow-on beacon 110, and, in response, the AP STA may accelerate the transmission of the follow-on beacon 110, i.e., it may transmit the follow-on beacon 110 earlier than it ordinarily would, in light of the periodicity in effect for follow-on beacons 110. Such acceleration of the transmission of the follow-on beacon 110 may avoid the need for the non-AP STA to remain awake for a prolonged period of time waiting for the follow-on beacon 110.

Figure 4:
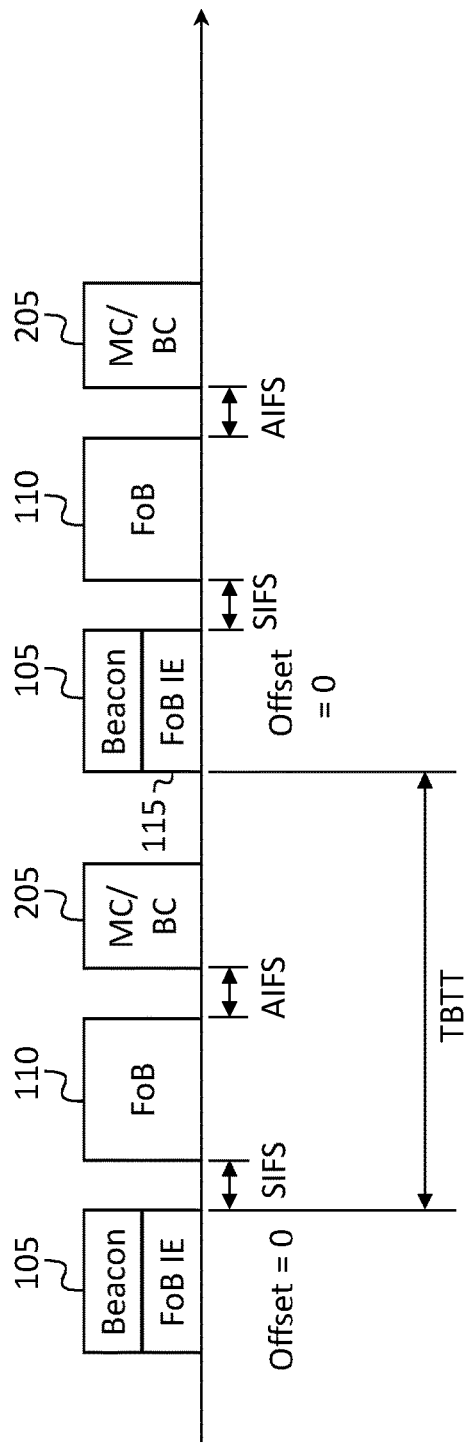
FIG. 4 is a signaling diagram, according to an embodiment of the present disclosure.

FIG. 4 illustrates an embodiment in which each follow-on beacon 110 follows, and supplements the feature information of, the beacon 105 by which, and with respect to which, the transmission time of the follow-on beacon 110 is specified (i.e., in the terminology used above, the first beacon 105, which specifies when the follow-on beacon 110 will be transmitted, is the same as the second beacon 105 (the feature information of which is supplemented by the feature information contained in the follow-on beacon 110)). In such an embodiment, each beacon 105 may specify an offset of 0 as shown (or the offset may not be specified by the beacon), and, accordingly, each follow-on beacon 110 may follow its beacon 105 by an SIFS delay. In the terminology used herein, if the first beacon specifies an offset at which a follow-on beacon cannot be transmitted, then the first beacon specifies a time of transmission that is the earliest time at which the follow-on beacon can be transmitted, for which the offset is at least equal to the specified offset. In FIG. 4, for example, the follow-on beacon cannot be transmitted with an offset of 0 (because the standard requires a minimum spacing of on SIFS), and therefore specifying, by the first beacon, an offset of 0, constitutes specifying, by the first beacon, a time of transmission that follows the end of the first beacon by one SIFS. Multicast or broadcast MPDUs may be transmitted after the follow-on beacon 110 (and separated from the follow-on beacon 110 by a gap of one AIFS).

Figure 5:
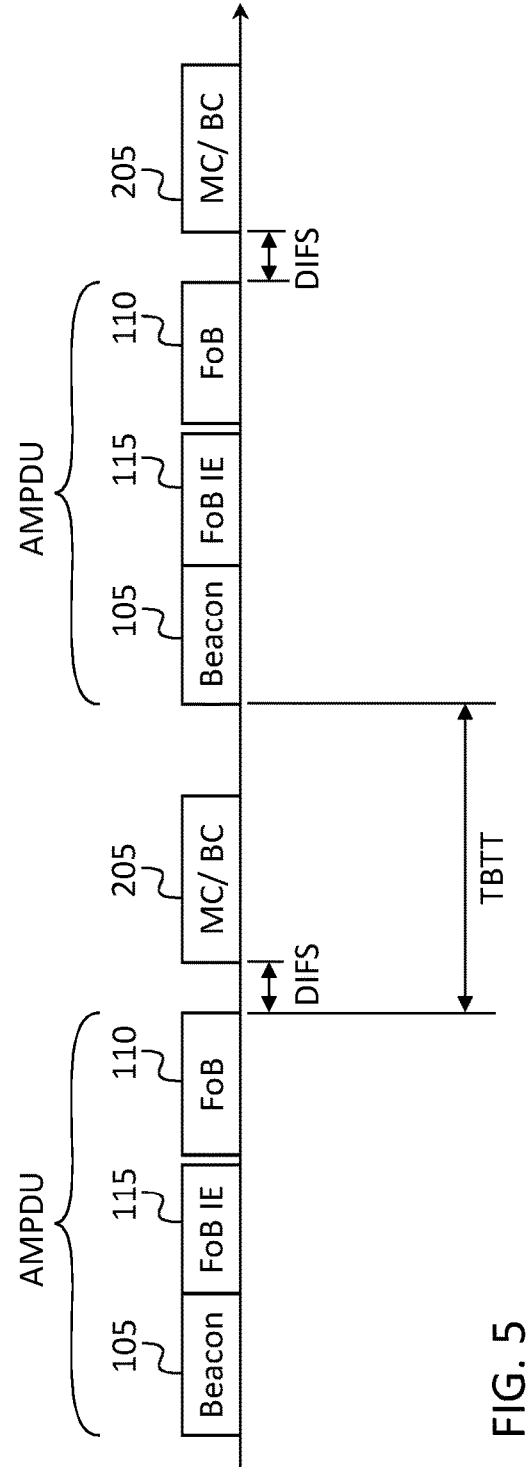
FIG. 5 is a signaling diagram, according to an embodiment of the present disclosure.
Figure 6:
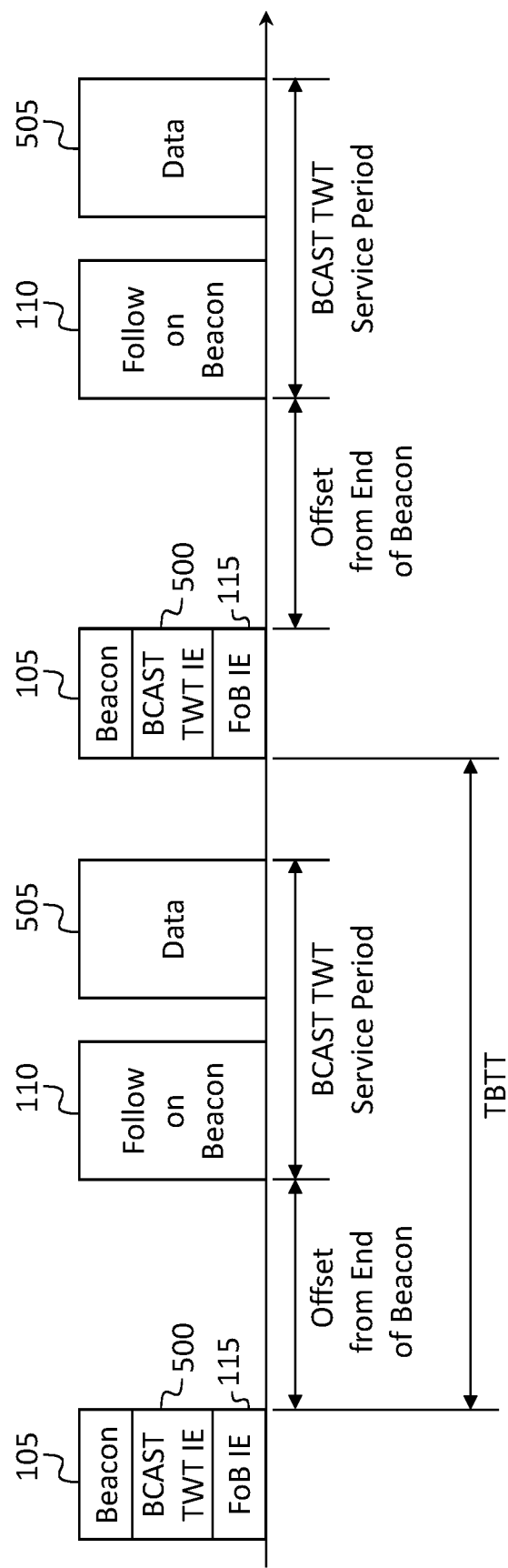
FIG. 6 is a signaling diagram, according to an embodiment of the present disclosure.

FIG. 5 illustrates an embodiment in which the beacon 105 and the follow-on beacon 110 are part of a single Aggregated MPDU (AMPDU). Such an embodiment may be practiced in a non-legacy band such as the 6 GHz band, in which beacons 105 may be sent at High Efficiency (HE) rates. Multicast or broadcast MPDUs may be transmitted after (e.g., separated by a gap of one Distributed Coordination Function (DCF) Inter-frame Space (DISFS) from) the AMPDU. FIG. 6 illustrates an embodiment in which the follow-on beacon 110 is sent within a broadcast Target Wake Time (TWT) service period (the presence of which is signaled by the presence of a broadcast Target Wake Time Information Element 500 in the beacon 105). One or more data frames 505 may also be sent within each broadcast Target Wake Time service period, as shown.

Figure 7A:
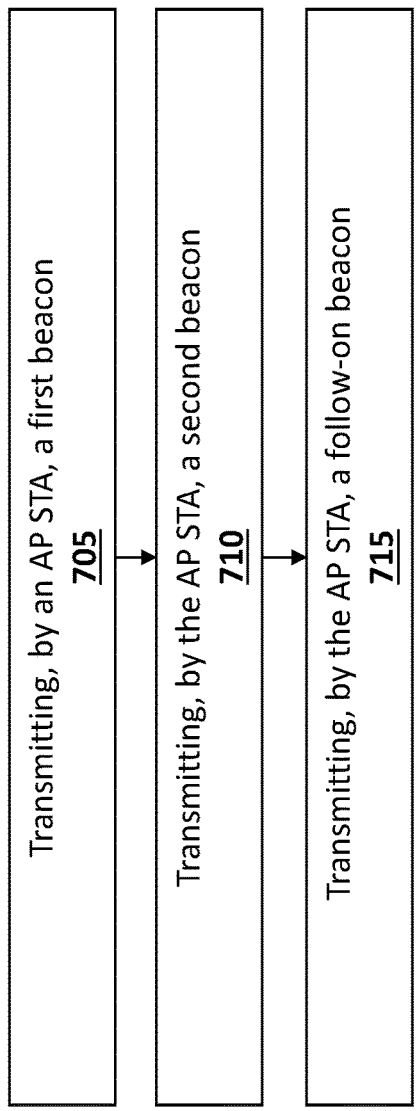
FIG. 7A is a flow chart, according to an embodiment of the present disclosure.
Figure 7B:
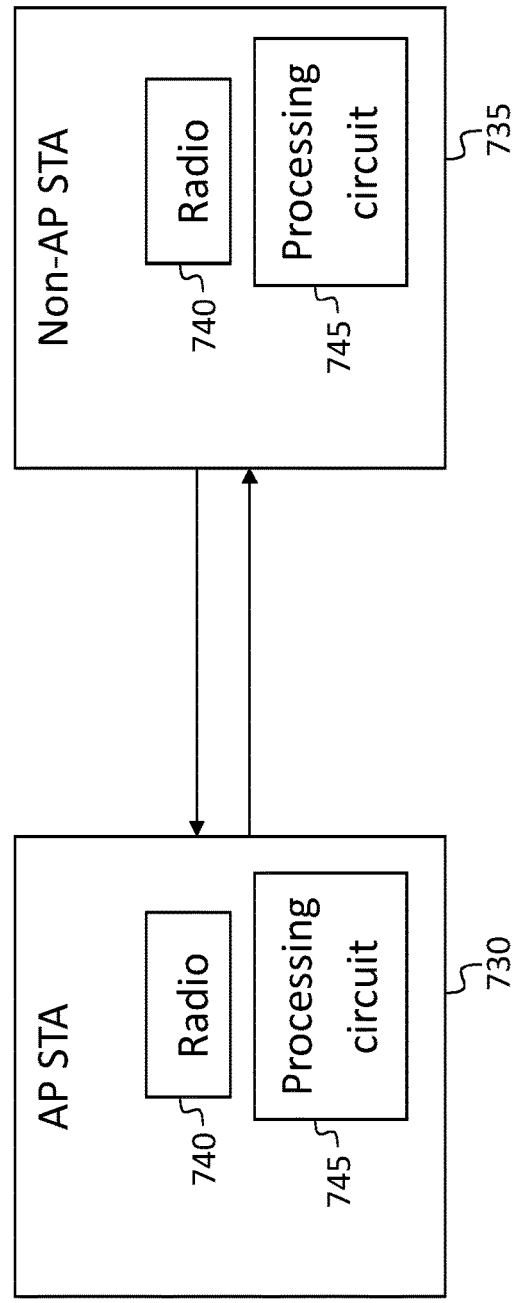
FIG. 7B is a block diagram of a portion of a wireless system, according to an embodiment of the present disclosure.

FIG. 7A is a flowchart, according to some embodiments. As illustrated, the AP STA transmits, at 705, a first beacon 105, the AP STA transmits, at 710, a second beacon 105 indicating feature information, and the AP STA transmits, at 715, a follow-on beacon supplementing the feature information indicated in the second beacon. The transmitting of the follow-on beacon may include transmitting the follow-on beacon at a time specified by the beacon. FIG. 7B shows a system including an AP STA 730 and a non-AP STA 735, in communication with each other. Each of the AP STA and the non-AP STA may include a respective radio 740 and a respective processing circuit (or a means for processing) 745, which may perform various methods disclosed herein, e.g., the processing circuit 745 of the AP STA 730 may perform (using the radio 740 of the AP STA 730) the method illustrated in FIG. 7A. In other examples, the processing circuit 745 of the non-AP STA 735 may receive, via the radio 740 of the non-AP STA 735, transmissions from the AP STA 730, and the processing circuit 745 of the non-AP STA 735 may transmit, via the radio 740 of the non-AP STA 735, signals to the AP STA 730.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for managing beacon size in a wireless network have been specifically described and illustrated herein, many modifications and variations will be apparent to those skilled in the art. Accordingly, it is to be understood that a system and method for managing beacon size in a wireless network constructed according to principles of this disclosure may be embodied other than as specifically described herein. The invention is also defined in the following claims, and equivalents thereof.

What is claimed is:

1. A method, comprising:
    transmitting, by an Access Point Station (AP STA), a first beacon comprising first feature information;
    transmitting, by the AP STA, a second beacon different from the first beacon indicating second feature information different from the first feature information; and
    transmitting, by the AP STA, a first follow-on beacon,
    the first follow-on beacon supplementing the second feature information indicated in the second beacon.

2. The method of claim 1, wherein the first beacon comprises information specifying a time of transmission of the first follow-on beacon, and
    the transmitting of the first follow-on beacon comprises transmitting the first follow-on beacon at the time specified by the first beacon.

3. The method of claim 1, wherein a gap between an end of the first follow-on beacon and a beginning of the second beacon has a length of one Short Interframe Space.

4. The method of claim 1, further comprising transmitting, by the AP STA, a third beacon indicating third feature information, there not being a follow-on beacon comprising feature information supplementing the third feature information indicated in the third beacon.

5. The method of claim 4, further comprising:
receiving, by the AP STA, an action frame requesting a follow-on beacon; and
sending, by the AP STA, in response to the receiving of the action frame, a follow-on beacon.

6. The method of claim 1, further comprising:
transmitting, by the AP STA, a third beacon;
transmitting, by the AP STA, a second follow-on beacon; and
transmitting, by the AP STA, a fourth beacon,
wherein:
the second follow-on beacon comprises feature information supplementing fourth feature information indicated in the fourth beacon; and
the transmitting of the second follow-on beacon comprises transmitting the second follow-on beacon at a time specified by:
the second beacon, and
the third beacon.

7. The method of claim 1, wherein the transmitting, by the AP STA, of the first follow-on beacon comprises transmitting the first follow-on beacon during a Broadcast Transmit Wait Time Service Period.

8. An Access Point Station (AP STA) comprising:
a radio; and
a processing circuit,
the processing circuit being configured to:
transmit a first beacon comprising first feature information;
transmit a second beacon different from the first beacon indicating second feature information different from the first feature information; and
transmit a first follow-on beacon,
the first follow-on beacon comprising feature information supplementing the second feature information indicated in the second beacon.

9. The AP STA of claim 8, wherein the processing circuit is further configured to transmit the first follow-on beacon at a time specified by the first beacon.

10. The AP STA of claim 8, wherein a gap between an end of the first follow-on beacon and a beginning of the second beacon has a length of one Short Interframe Space.

11. The AP STA of claim 8, wherein:
the processing circuit is further configured to transmit a third beacon indicating third feature information,
there not being a follow-on beacon comprising feature information supplementing the third feature information indicated in the third beacon.

12. The AP STA of claim 8, wherein the processing circuit is further configured to:
transmit a third beacon;
transmit a second follow-on beacon; and
transmit a fourth beacon,
wherein:
the second follow-on beacon comprises feature information supplementing fourth feature information indicated in the fourth beacon; and
the transmitting of the second follow-on beacon comprises transmitting the second follow-on beacon at a time specified by:
the second beacon, and
the third beacon.

13. The AP STA of claim 8, wherein a gap between an end of the first beacon and a beginning of the first follow-on beacon has a length of one Short Interframe Space.

14. The AP STA of claim 8, wherein the transmitting, by the AP STA, of the first follow-on beacon, comprises transmitting the first follow-on beacon during a Broadcast Transmit Wait Time Service Period.

15. A method, comprising:
receiving, by a non-Access Point Station (non-AP STA), a first beacon comprising first feature information;
receiving, by the non-AP STA, a second beacon different from the first beacon indicating second feature information different from the first feature information;
listening, by the non-AP STA, for a first follow-on beacon; and
receiving, by the non-AP STA, the first follow-on beacon,
the first follow-on beacon comprising feature information supplementing the second feature information indicated in the second beacon.

16. The method of claim 15, wherein:
the first beacon comprises information specifying a time of transmission of the first follow-on beacon;
the listening for the first follow-on beacon comprises listening for the first follow-on beacon at the time specified by the first beacon; and
the receiving of the first follow-on beacon comprises receiving the first follow-on beacon at the time specified by the first beacon.

17. The method of claim 15, wherein a gap between an end of the first follow-on beacon and a beginning of the second beacon has a length of one Short Interframe Space.

18. The method of claim 15, further comprising:
receiving, by the non-AP STA, a third beacon
receiving, by the non-AP STA, a second follow-on beacon; and
receiving, by the non-AP STA, a fourth beacon,
wherein:
the second follow-on beacon comprises feature information supplementing fourth feature information indicated in the fourth beacon; and
the receiving of the second follow-on beacon comprises receiving second first follow-on beacon at a time specified by:
the second beacon, and
the third beacon.

19. The method of claim 15, wherein a gap between an end of the first beacon and a beginning of the first follow-on beacon has a length of one Short Interframe Space.

* * * * *